United States Patent [19]

Medvedev et al.

[11] Patent Number: 6,013,341

[45] Date of Patent: Jan. 11, 2000

[54] CARRYING (BEARING) PIPE-CASING MADE OF COMPOSITE MATERIALS, THE METHOD AND THE SETTING (STRAIGHTENING DEVICE) FOR ITS MANUFACTURING

[75] Inventors: Eduard Borisovich Medvedev, Akademika Koroleva; Alexandr Ivanovich Davydov, Chemyakhovskogo; Boris Gavrilovich Maiorov, Kalinina; Mikhail Sergeevich Artjukhov, Zelenava; Vladimir Ivanovich Smyslov, Kalinina, all of Russian Federation

[73] Assignees: McDonnell Douglas Corporation, Huntington Beach, Calif.; AO "Centr Perspektivnykh Razarabotok", Khutkovo, Russian Federation

[21] Appl. No.: 08/697,089

[22] Filed: Aug. 19, 1996

[51] Int. Cl.⁷ ........................................... B32B 1/08
[52] U.S. Cl. ...................... 428/36.3; 428/36.1; 428/36.9; 428/114
[58] Field of Search ................................ 428/36.3, 36.1, 428/114, 36.9

[56] References Cited

U.S. PATENT DOCUMENTS 3,083,864  4/1963  Young .
4,137,354  1/1979  Mayes .
4,284,679  8/1981  Blad .
4,495,231  1/1985  Laskaris et al. .................... 428/36.3 X
4,621,980  11/1986  Reavely et al. .................... 428/36.3 X
4,940,617  7/1990  Baurmeister et al. ................. 428/36.3

*Primary Examiner*—Daniel Zirker
*Attorney, Agent, or Firm*—Alston & Bird LLP

[57] ABSTRACT

A load-bearing tubular structural shell for use particularly in aerospace applications includes a structural frame of lattice-like structure formed by intersecting helical, girth, and longitudinal stiffening ribs, ad an outer covering surrounding the structural frame. The ribs are formed by helical, girth, and longitudinal strips of unbidirectional fibers wrapped in intersecting and overlapping fashion to form a plurality of layers of the strips. The longitudinal and girth ribs intersect at nodes, and at least some of these nodes are attached to helical ribs so as to form closed structural triangular nodes. Two sides of each triangular node are formed by first faces of the longitudinal and girth ribs, and the opposite second faces of the longitudinal and girth ribs intersect at a corner that lies within the closed triangular node. The helical rib at the triangular node has one face that lies within the closed triangular node and an opposite face that forms a third side of the triangular node.

3 Claims, 5 Drawing Sheets

CARRYING (BEARING) PIPE-CASING MADE OF COMPOSITE MATERIALS, THE METHOD AND THE SETTING (STRAIGHTENING DEVICE) FOR ITS MANUFACTURING

The invention relates generally to machine-building and more particularly to the shell construction of airframe parts used in aerospace equipment operating under compound stress. The invention also covers a process and apparatus for the fabrication of such parts.

One known method is a tubular vessel in the form of a composite cylindrical body which consists of a shell and a lattice-type grid formed by the interlaced helical, and girth strips (U.S. Pat. No. 3,083,864, Cl. 220-83, 1963).

Another known process is a composite tubular vessel in the form of a cylindrical body which consists of a lattice-type grid formed by the intersecting unidirectional filaments and an external protective cover (U.S. Pat. No. 4,137,354, cl. 428-116, 1979).

The primary disadvantage of these known methods of fabrication is lowered strength and rigidity since the tubular pressure vessels are subject to local instability. Also, increased load at the nodes shared by the intersecting helical, longitudinal, and ring-shaped strips which contain triple the amount of reinforcing material lowers the solidity of the boundaries of the cells.

To ensure proper performance under compound stress with simultaneous compression, torsion, and bending, these tubular vessels are reinforced, which makes them excessively heavy.

In terms of the basic technological features, the method most similar to the invention is a composite pressure vessel in the form of a cylindrical body, and comprised of lattice-type grid; the grid represents a layered sequence of interlaced helical, longitudinal, and girth strips imbedded in the matrix. The strips are made of unidirectional filaments which form stiffening ribs between the nodes formed by their intersections; they also form a protective covering (U.S. Pat. No. 4,284,679, cl. 428-218, 1978). This tubular vessel, chosen as the prototype, also suffers from the aforementioned disadvantages.

The object of the invention is to provide a tubular structural shell made of composites in the form of a cylindrical body. Another object is to provide a process and a mandrel device for the fabrication of such a structure, which would feature reliable performance under compound stress with simultaneous stress action of compression, torsion, and bending. The invention also aims to develop a tubular structure of the smallest possible mass.

The technical results of the invention and the object thereof are increased strength and rigidity of the construction. The embodiment of the invention incorporates the creation of closed structural cells which form triangles at the nodes of intersection of the variously oriented strips, the creation of a corresponding pattern of the strips to be imbedded, and a special organization of the points of intersection of the variously oriented grooves upon application to the mandrel with the formation of triangular voids (nests).

Embodiment. The tubular structural shell in the form of a composite cylindrical body which comprises a grid frame of lattice-like structure with an axially layered pattern of intersecting helical, longitudinal and girth strips of unidirectional fibers which form stiffening ribs between the nodes of their intersections. The shell features a contiguous external protective covering; the nodes of intersections of longitudinal and girth strips with each helical strip are executed in the form of closed structural triangles with a common apex of the faces of intersections of longitudinal strips with girth ones, and, analogously, longitudinal and girth strips with helical ones, distributed on a border of helical strips, with a volume ratio of helical, longitudinal and girth strips from 1:0, 3:0, 3 up to 1:3:3.

The fabrication of the tubular shell of lattice-like structure of composite materials incorporates a core covered with rubber-like material with a web of mutually intersecting grooves, imbedding in the grooves of intersecting helical, longitudinal, and girth strips of unidirectional fibers impregnated with a bonding element for the formation of stiffening ribs, the matrix created is pressed with mold blocks and heat treatment applied. Subsequently, the core and the rubber-like covering are removed. The imbedding of strips into the grooves for the formation of stiffening ribs is completed by forcing additional rubber-like covering material which protrudes beyond the stiffening ribs by 0.02–0.3 of their height, which during the application of the molding blocks lifts them with a force which is sufficient for their deformation in axial directions by the amount of the deposited material for sealing and bonding the skin to the stiffening ribs. In addition, girth ribbons of the outer surface are used as the molding elements, and the intersection of the longitudinal and the girth ribbons is executed contiguously with the helical strips.

The mandrel for the fabrication of the composite tubular shell of a lattice-like structure contains a core and a rubber-like material covering it. The latter features a web of mutually intersecting grooves for the imbedding of intersecting helical, longitudinal, and girth strips made of unidirectional fibers for the formation of stiffening ribs of the grid frame of the tubular shell; the rubber-like material on its core is made of flexible flat plates with straight mutually intersecting grooves on their outer surface with the formation of blunted flanges and triangular cavities at the nodes of intersection, which are curved along the radius of curvature of the core surface and attached along the orientation of the grooves. In addition, the geometrical planes of the side edges of the blunt flanges intersect in one common line of intersection, inside the triangular cavity.

The novel distinguishing characteristics of the tubular structural shell are:
the execution of the nodes of intersecting longitudinal and girth ribbons with each helical ribbon in the form of closed structural triangles
with a common apex of the faces of intersections of longitudinal ribbons with girth ones and, correspondingly, longitudinal and girth ribbons with helical ones
distributed along the edge of the helical strips;
a volume ratio of helical, longitudinal, and girth ribbons from 1:0, 3:0, 3 to 1:3:3.

The novel and distinguishing characteristics of the fabrication process of the composite tubular shell having lattice-like structure are
the execution of the nodes of intersection of longitudinal and girth ribbons with each helical ribbon in the form of closed structural triangles
with a common apex of corners of the faces of intersection of longitudinal ribbons with girth ribbons and, accordingly, longitudinal and girth ribbons with helical ones
the imbedding of the strips into the grooves for the formation of stiffening ribs and depositing additional rubber-like covering material
which protrudes beyond the ribs by an amount equal to 0.02–0.3 of their height;

clamping of said covering material to the ribs by mold-blocks
with a force sufficient for their deformation in an axial direction by the amount of the deposited material in order to seal and bond the skin to the ribs;
the use of girth strips of the surface layer as mold elements;
the execution of intersections of longitudinal and girth strips contiguous with the helical strips The aforementioned novel features of the mandrel for the fabrication of composite tubular shell of lattice-like structure of are
the execution of rubber-like material on the mandrel core in the form of flexible flat plates,
with linear mutually intersecting grooves on their outer surface,
with the formation of blunt protuberances and triangular cavities at the nodes of intersection,
the curving of the aforementioned plates along the radius of curvature of the core surface,
the attachment of the above plates along the directions of the grooves,
the intersection of the geometrical faces of the side edges of the blunt flanges inside the triangular cavities in the common line of intersection.

The indicated novel features are significant. Individually and in combination with others, these features target a new and positive result based on the object of the invention as stated above. The exclusion of any one step interferes with the stated objective. For example, the problem would not be solved and, consequently, the object of the invention not attained if there is: the failure to execute the nodes of intersections of longitudinal and girth strips with helical ones in the form of closed structural triangles in the tubular shell, or failure to execute the complimentary triangular cavities at the intersections of the grooves in the mandrel in order to form the shell with the respective nodes of intersections, or the absence of a pressurized clamping of the skin layers to the ribs which ensures a reliable bond.

The use of the novel and significant elements has not been discovered in any known solutions, similar devices, or prototypes. This allows us to characterize the proposed embodiment as "an innovation".

The combinations of commonly known and new significant features allows us to accomplish the object of the invention and to attain a new positive result in the fabrication of a composite tubular structural shell capable of operating in a compound stress state with simultaneous compression, torsion and bending. This allows us to characterize the proposed technical solutions as essentially different from the known technologies and prototypes. The invention is the result of a creative contribution and experimental research without the use of technical documentation and standards, i.e. the invention meets the criterion of "the stage of invention".

The significant features of the invention are illustrated by the drawings.

Figure 5A:
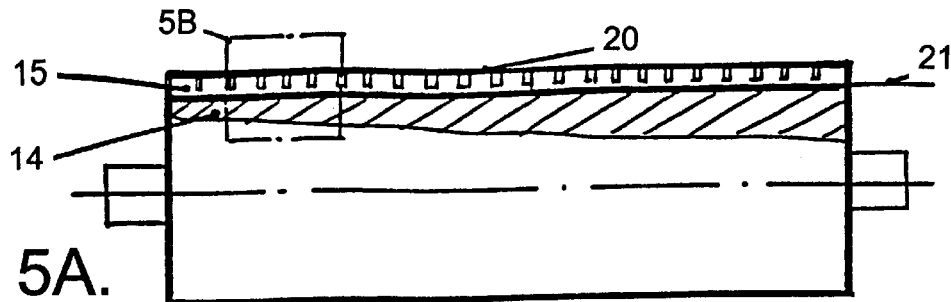
Figure 5B:
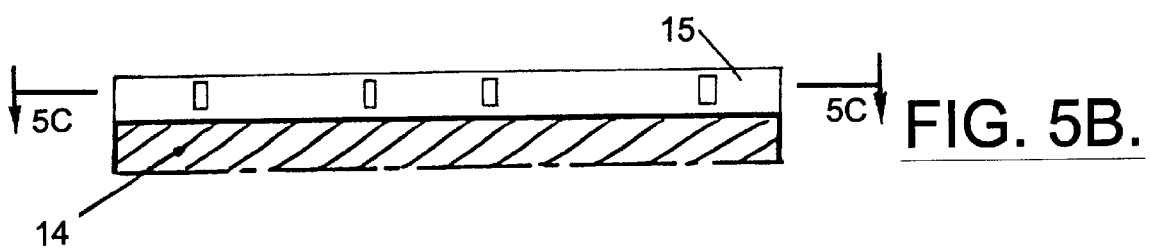
Figure 5C:
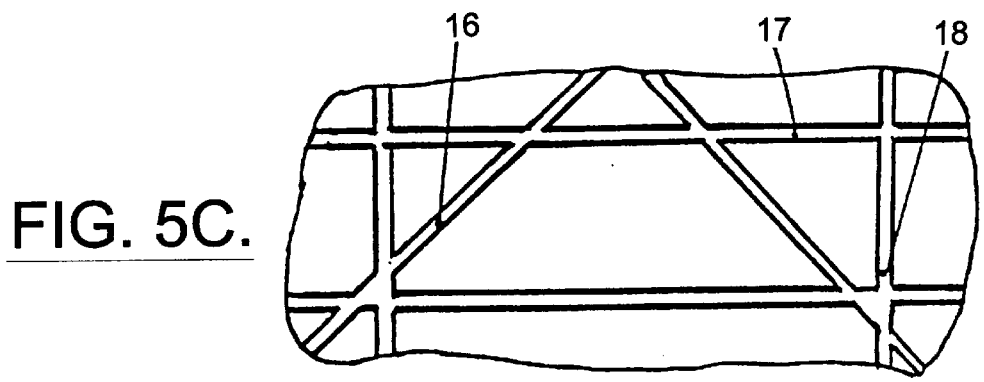
Figure 6A:
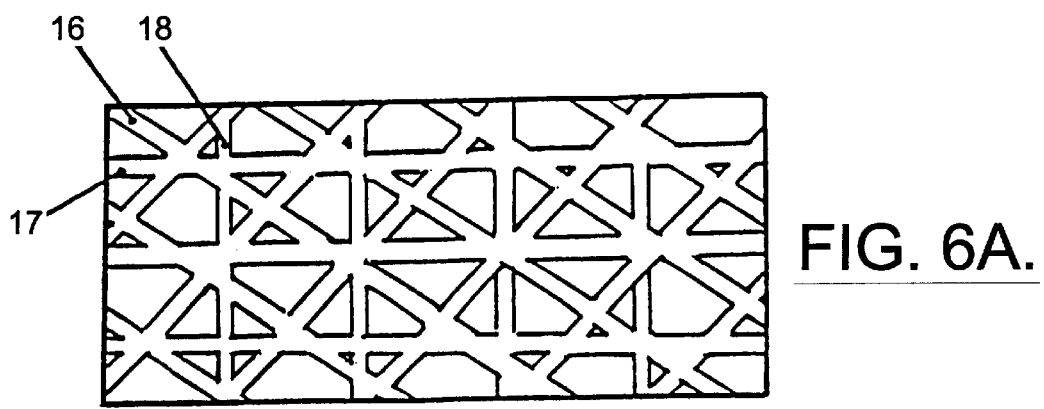
Figure 6B:
Figure 7:
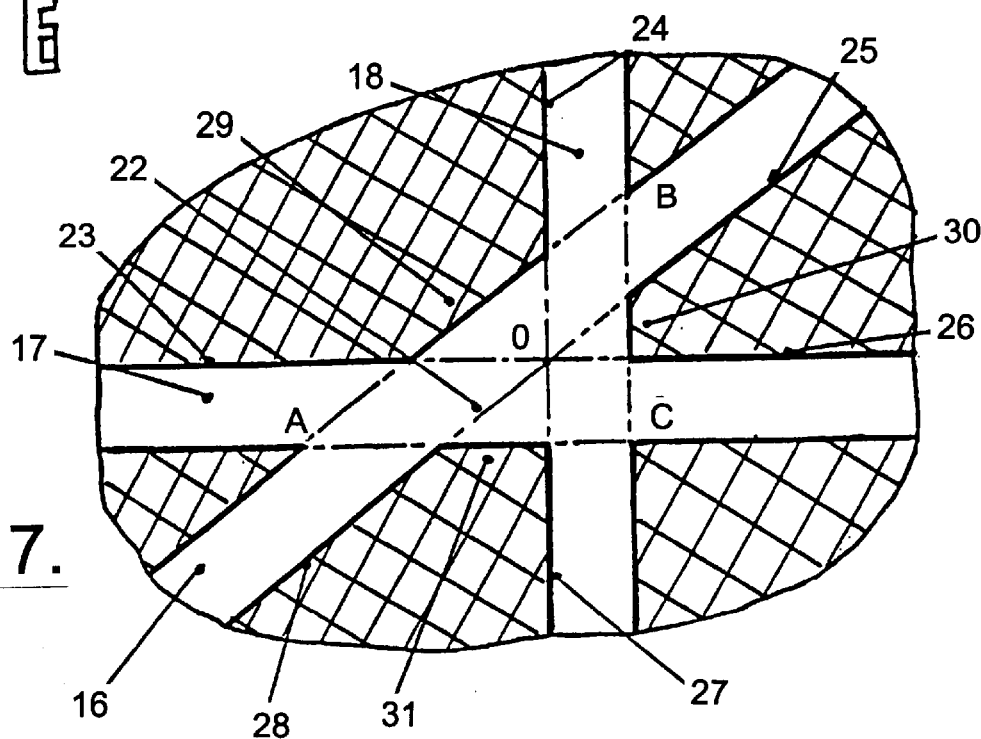
Figure 9:
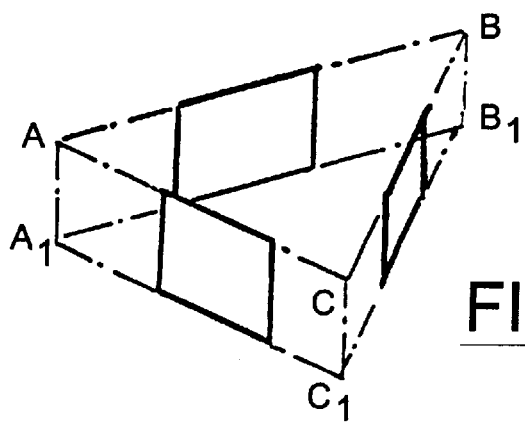
Figure 8:
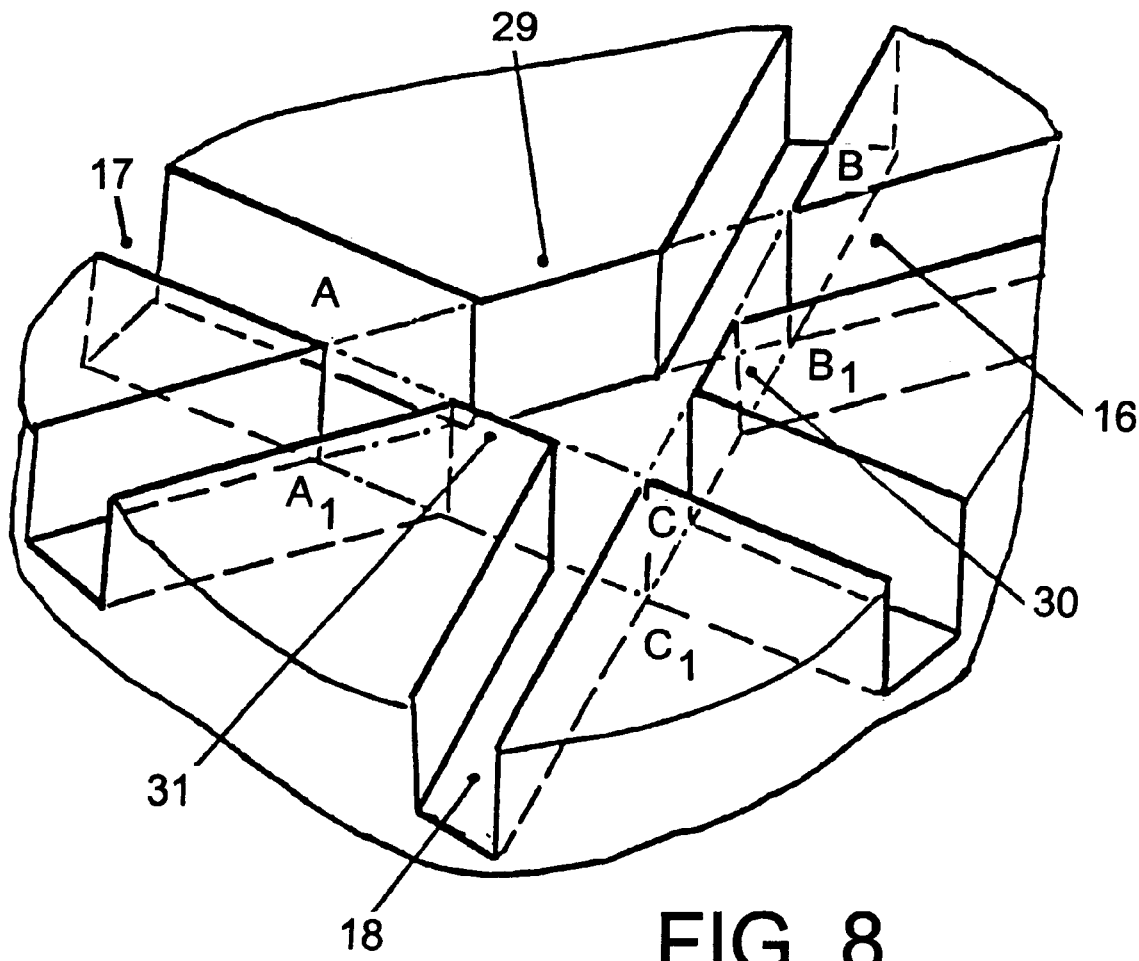

FIG. 5 presents the top and side view of the rubber-like lamination;

FIG. 6 shows top and side elevations of a flexible flat plate having intersecting grooves for receiving strips of composite material to form intersecting stiffening ribs;

FIG. 7 depicts a plan view of the intersection of grooves running in a girth, longitudinal and helical pattern;

FIG. 8 depicts in axiometric projection the triangular cavity, formed by the intersection of the helical, longitudinal and girth grooves;

FIG. 9 is the contour of the cavity in the form of a three-sided prism.

Figure 1:
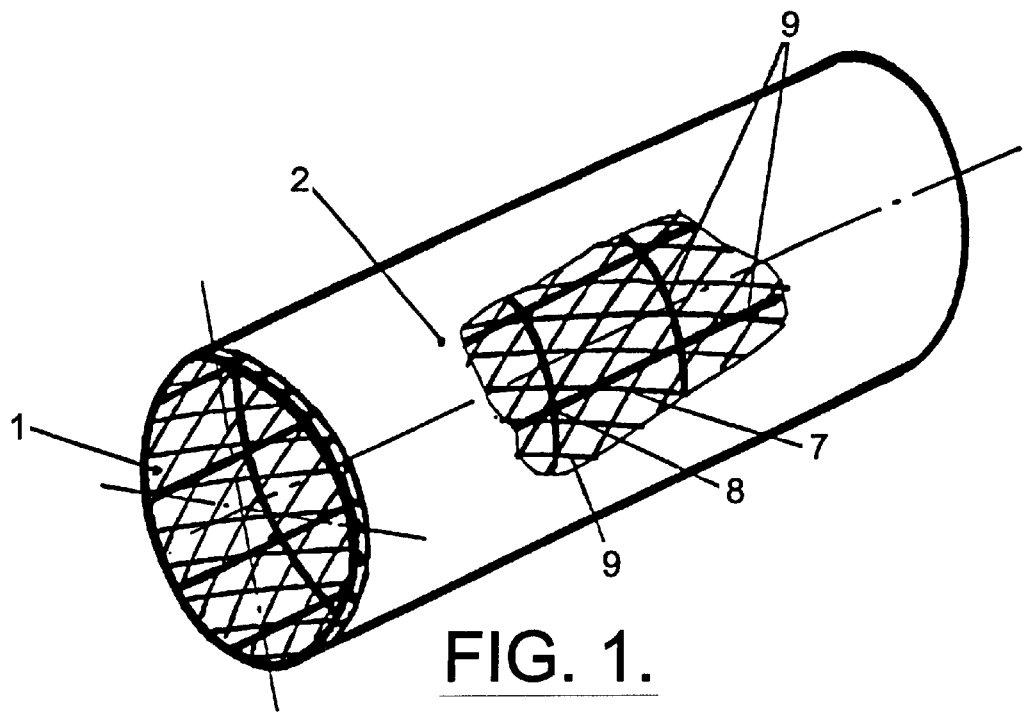
FIG. 1 depicts a general perspective view of the tubular structural shell.
Figure 2A:
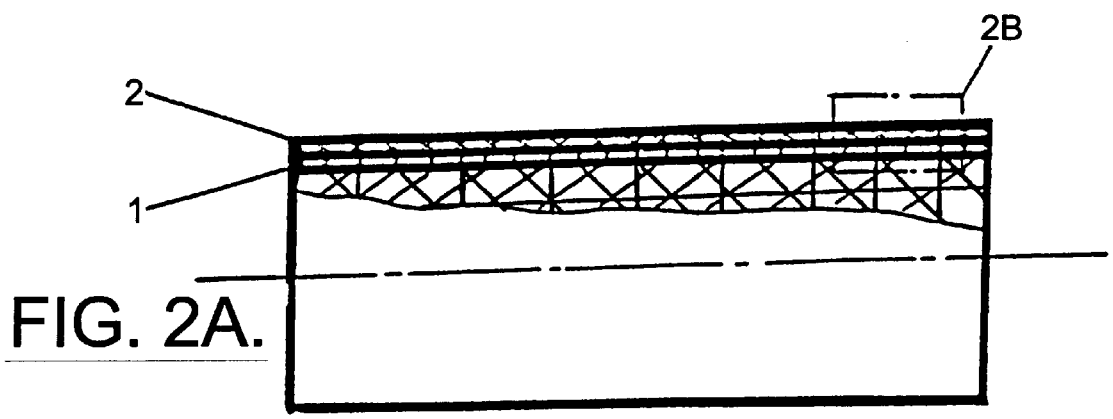
FIG. 2 is a longitudinal cross-section accompanied by an sectional treatment I and a cross-section at A—A.
Figure 2B:
Figure 2C:
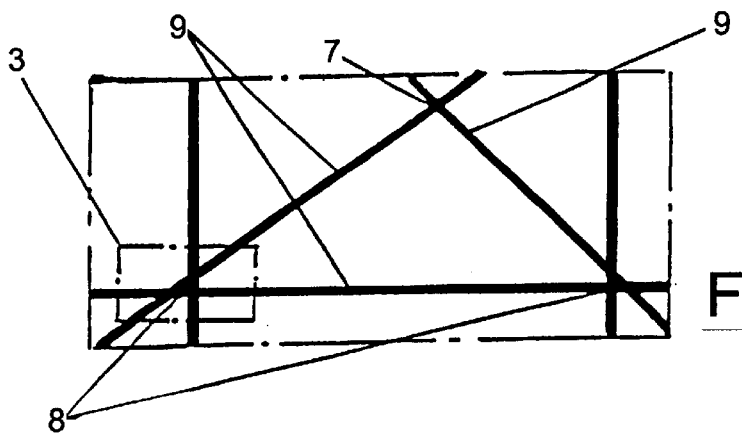

The tubular structural shell is executed in the form of a composite cylindrical body and consists of an structural grid 1 of lattice-like structure and an external protective covering 2 (FIG. 1–2).

Figure 4:
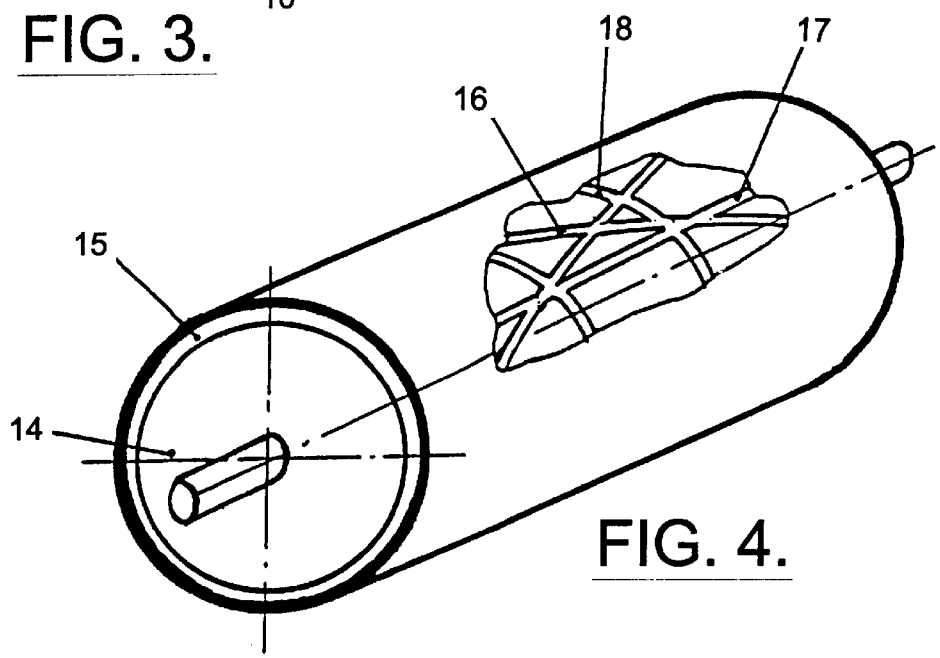
FIG. 4 depicts the general view of the mandrel.

The grid 1 is executed as an axially layered system of intersecting helical, longitudinal and girth strips 3, 4, and 5 made of unidirectional fibers 6 (FIG. 4), which form nodes 7 and 8 and the stiffening ribs 9 between them (FIG. 1,3)

The nodes of intersection 3 of longitudinal and girth strips 4 and 5 with helical ones 3 form closed structural triangles ABC (FIG. 3) with a common apex 0 of angles of the faces of intersections 10, 11, and 12 of the longitudinal strips 4 with girth strips 5 as well as girth strips 4 and 5 with each helical strip 3.

Apex 0 of the angles of the faces of intersections 10, 11, and 12 is situated on the edge 13 of the helical strips 3.

The volume ratio of the helical, longitudinal, and the girth strips 3, 4, and 5 ranges from 1:0,3:0,3 to 1:3:3.

The skin of the lattice-like structure is fabricated in the following way: The mandrel contains the core 14 (FIG. 4,5) and the rubber-like material covering it 15 with the mutually intersecting grooves 16, 17, and 18 of helical, longitudinal and girth patterns respectively. The grooves 16, 17, and 18 are imbedded with intersecting helical coil, longitudinal and girth strips 3, 4, 5 made of unidirectional fibers 6, which are impregnated with an bonding agent, thus forming an attachment of the nodes of intersections of longitudinal and helical strips 4 and 5 with each helical strip 3 and forming stiffening ribs 9 of the structural grid 1 of tubular vessel (FIG. 1,2).

The imbedding of the strips 3, 4, and 5 is completed with the deposit of a rubber-like material 15 upon the stiffening ribs 9 with protrusion of 0.02–0.3 of the height of the ribs. Next, girth strips 5 are wound in order to ensure elastic deformation of the rubber-like lamination 15 and the formation of an external protective covering 2, attached to ribs 9 and the nodes of intersections 7 and 8 (FIG. 1)

Heat treatment is subsequently applied, the core 14 and the rubber-like material 15 of the mandrel are removed. The lattice-type tubular shell may be fabricated using carbon plastic, organic carbon, or Plexiglas which feature high-modulus filaments.

The rubber-like material 115 applied to the mandrel core 14 is produced from flexible flat plates 19 with linear mutually intersecting grooves 16, 17, and 18 on their outer surface 20 (FIG. 6).

The plates 19 are curved along the curvature of the surface 21 of the core 14 and are attached along the directions of the grooves 16, 17, and 18.

The intersecting grooves 17 and 19, of the longitudinal and girth orientations, respectively, intersect girth groove 16 to form triangular cavities 22 in the form of three-sided prisms ABC-A,B,C (FIG. 7, 8, and 9).

The geometric faces of the side edges 23–24, 25–26, 27–28 of the blunt flanges 29, 30, and 31 intersect inside the triangular cavities 2 in a common line of intersection (see plan view in FIG. 7) at the central point O.

The tubular shell, fabricated according to the prescribed manner on the modified mandrel, features greater strength, rigidity and durability, while maintaining the least possible weight.

Figure 3:
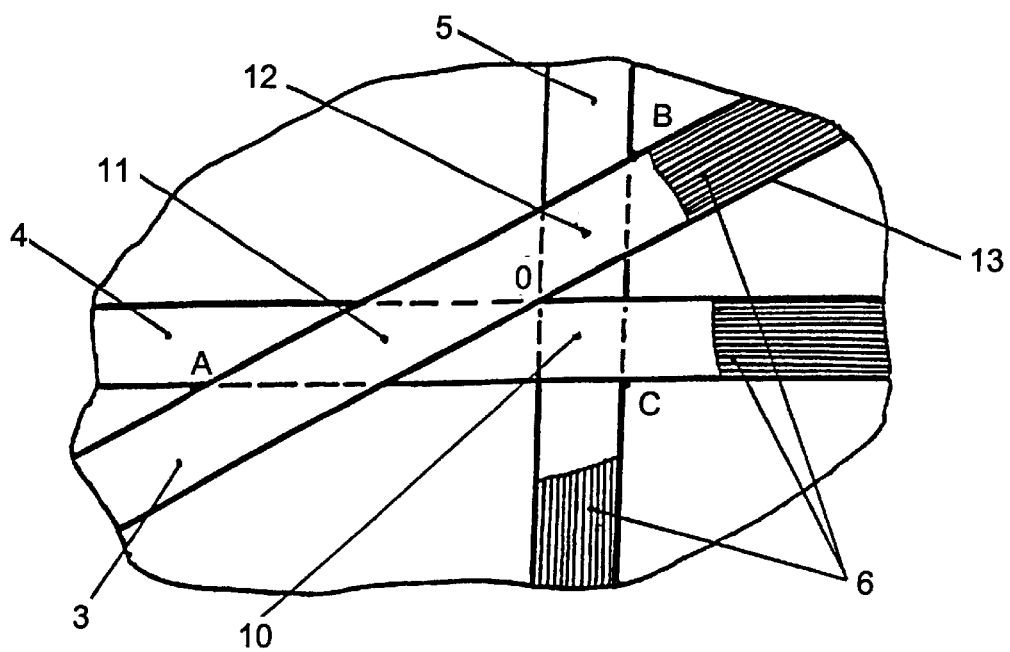
FIG. 3 is a plan view of the node of intersection of girth, longitudinal and helical strips with the formation of a closed structural triangle.

The tubular shell features novel technical implementation of the nodes of intersection of girth strips 5 with longitudinal strips 4, attached to the helical strip 3 (FIG. 3). This forms a closed structural node 8 (FIG. 1 and 2). The load exerted upon these nodes is distributed along a larger area in comparison with the existing embodiments since the intersection of the strips 3, 4, and 5 is executed in the form of a closed triangular interlocking [?zamkovoe] connection. At such points of intersection of the variously oriented strips, excess build-up of the armature material is prevented and the consistent solidity of the edges of the ribs along the contour of the cells is preserved.

The volume ratios of the helical, longitudinal and girth strips are 1:0, 3:0, 3 and correspond to the minimal quantity of material in the lattice-like layer. The quantity of longitudinal and girth strips less their respective share of 0,3 significantly undermines the technological possibilities of the winding process; the number of the layers increases as does the axial dimension of the vessel wall, which is unacceptable due to the specifications governing the geometrical parameters of the structure.

The volume ratios of helical, longitudinal, and girth strips of 1:3:3 correspond to the maximum quantity of material in the grid layer. The quantity of longitudinal and girth strips of more than their respective share 3, increases the continuity of the primary layers to such an extent that the walls of the vessel become porous rather than lattice-like. The excessive bonding agent which accumulates in the pores is impossible to remove. As a result, the weight of the shell increases and although the strength and rigidity also increases, the weight-to-strength coefficient is reduced.

The choice of proper material for the helical, longitudinal, and the girth strips within the limits of the volume ratios of 1:0,3:0,3 to 1:2:3 yields high performance tubular shells with a lattice-like structure of the walls, fabricated using the new technical solutions for constructing a pattern of the nodes of intersections as well as the method and the mandrel for the fabrication of said vessels with maximum strength-to-weight ratio.

A prototype model of the tubular shell was manufactured from carbon-plastic on the basis of filament UKN/5000 (All-Union State Standard 8008-88), impregnated with a bonding material EHD-MK (Branch Standard 3-459-80). The winding parameters are given in the table.

TABLE

| | Helical strips | Long. strips | Girth strips | Rib frame |
|---|---|---|---|---|
| Qty. of fibers per strip | 6 | 6 | 4 | axial - 90 girth - 6 |
| Weight of impregnated strip, length 500 mm, grams | 1.85 | 1.5 | 1.3 | — |
| Temp. of bonding agent in bath, degrees C. | 50 | 50 | 50 | — |
| Strip tension kGc | 9 | 9 | 6 | 8 |
| Width of strip meters | 6 | 6 | 4 | 10 |

The results of testing the prototype model have shown the effectiveness and the industrial usefulness of the fabrication of tubular shells employing the technical solutions described.

Thus, the technical solutions presented yield improved quality, strength, rigidity, and reliability of the tubular composite shell having lattice-like structure. The proposed methods meet the criterion of being "technologically useful", i.e. qualified as an invention. Accordingly, their development and implementation ought to be granted protection of exclusive patent rights.

Inventors
E. B. Medvedev (signed)
A. I. Davydov (")
B. G. Maiorov (")
M. S. Artykhov (")
V. I. Smyslov (")

We claim:

1. A tubular structural shell in the form of a cylindrical composite body, said tubular structural shell comprising:

a structural framne of lattice-like structure having an axially layered system of intersecting helical, longitudinal and girth strips formed of unidirectional fibers which respectively form stiffening ribs extending in helical, longitudinal and girth directions; and an external protective covering surrounding said structural frame, wherein the longitudinal and girth ribs intersect at nodes and at least some of said nodes are attached to helical ribs so as to form closed structural triangular nodes, two sides of each triangular node being formed by first faces of the intersecting longitudinal and girth ribs, second faces of the longitudinal and girth ribs intersecting to form a corner lying within the triangular node, and the helical rib at each triangular node having one face that lies within the triangular node and an opposite face that forms a third side of the triangular node.

2. A tubular shell according to claim 1 wherein said corner defined by the intersection of said second faces of the longitudinal and girth ribs is disposed on said one face of the helical rib.

3. A tubular shell according to claim 1 wherein the helical, longitudinal and girth strips are present in the shell in relative volume proportions of about 1:0.3:0.3 to 1:3:3.

* * * * *